United States Patent
Christen et al.

(10) Patent No.: US 10,286,807 B2
(45) Date of Patent: May 14, 2019

(54) LOCATION-BASED ELECTRIC VEHICLE PREEMPTIVE COOLING FOR DC FAST CHARGE

(71) Applicant: FORD GLOBAL TECHNOLOGIES, LLC, Dearborn, MI (US)

(72) Inventors: Erik J. Christen, Royal Oak, MI (US); Jaswant-Jas S. Dhillon, Canton, MI (US); Derek Hartl, Birmingham, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 323 days.

(21) Appl. No.: 15/266,275

(22) Filed: Sep. 15, 2016

(65) Prior Publication Data

US 2018/0072181 A1  Mar. 15, 2018

(51) Int. Cl.
*H01M 10/613* (2014.01)
*B60L 11/18* (2006.01)
(Continued)

(52) U.S. Cl.
CPC ......... *B60L 11/1874* (2013.01); *B60L 11/185* (2013.01); *B60L 11/1861* (2013.01); *H01M 10/486* (2013.01); *H01M 10/488* (2013.01); *H01M 10/613* (2015.04); *H01M 10/625* (2015.04); *H01M 10/633* (2015.04); *B60L 2240/34* (2013.01); *B60L 2240/36* (2013.01); *B60L 2240/545* (2013.01); *B60L 2240/622* (2013.01); *B60L 2240/662* (2013.01); *B60L 2240/80* (2013.01); *B60L 2260/50* (2013.01); *H01M 2220/20* (2013.01);
(Continued)

(58) Field of Classification Search
CPC ............. Y02T 10/7005; Y02T 10/7044; Y02T 10/705; Y02T 10/7072; Y02T 10/7291; Y02T 90/121; Y02T 90/128; Y02T 90/14; Y02T 90/16; Y02T 90/162; B60L 11/185; B60L 11/1861; B60L 2240/34; B60L 2240/36; B60L 2240/622; B60L 2240/662; B60L 2240/80; B60L 2240/545; B60L 2260/50; B60L 11/1874; H01M 10/613; H01M 10/625; H01M 10/633; H01M 10/486; H01M 10/488; H01M 2220/20
USPC .......................................................... 429/62
See application file for complete search history.

(56) References Cited

U.S. PATENT DOCUMENTS

| | | | |
|---|---|---|---|
| 9,290,108 B2* | 3/2016 | Payne | .................. B60L 11/1874 |
| 2012/0043935 A1* | 2/2012 | Dyer | ...................... B60L 1/003 320/109 |

(Continued)

FOREIGN PATENT DOCUMENTS

WO   2015/177218 A1   11/2015

*Primary Examiner* — Anthony R Jimenez
(74) *Attorney, Agent, or Firm* — David B. Kelley; Brooks Kushman P.C.

(57) ABSTRACT

Methods and systems for electric vehicles, such as battery electric vehicles (BEV) and plug-in hybrid electric vehicles (PHEV), include preemptively cooling a traction battery of the vehicle when a DC Fast Charge (DCFC) event is expected. The expected DCFC event is predicted during a drive cycle and prior to arrival at a DCFC station, based on drive history data of the vehicle or battery state of charge. Preemptive cooling is inhibited if the expected DCFC event can be completed in an amount of time less than a predefined amount of time.

17 Claims, 1 Drawing Sheet

(51) Int. Cl.
*H01M 10/625* (2014.01)
*H01M 10/633* (2014.01)
*H01M 10/48* (2006.01)

(52) U.S. Cl.
CPC .......... *Y02T 10/705* (2013.01); *Y02T 10/7005* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01)

(56) References Cited

U.S. PATENT DOCUMENTS

| | | |
|---|---|---|
| 2014/0121866 A1 | 5/2014 | Dangler et al. |
| 2014/0326430 A1 | 11/2014 | Carpenter et al. |
| 2014/0326530 A1 | 11/2014 | Carpenter et al. |
| 2016/0129797 A1 | 5/2016 | Jackson et al. |

* cited by examiner

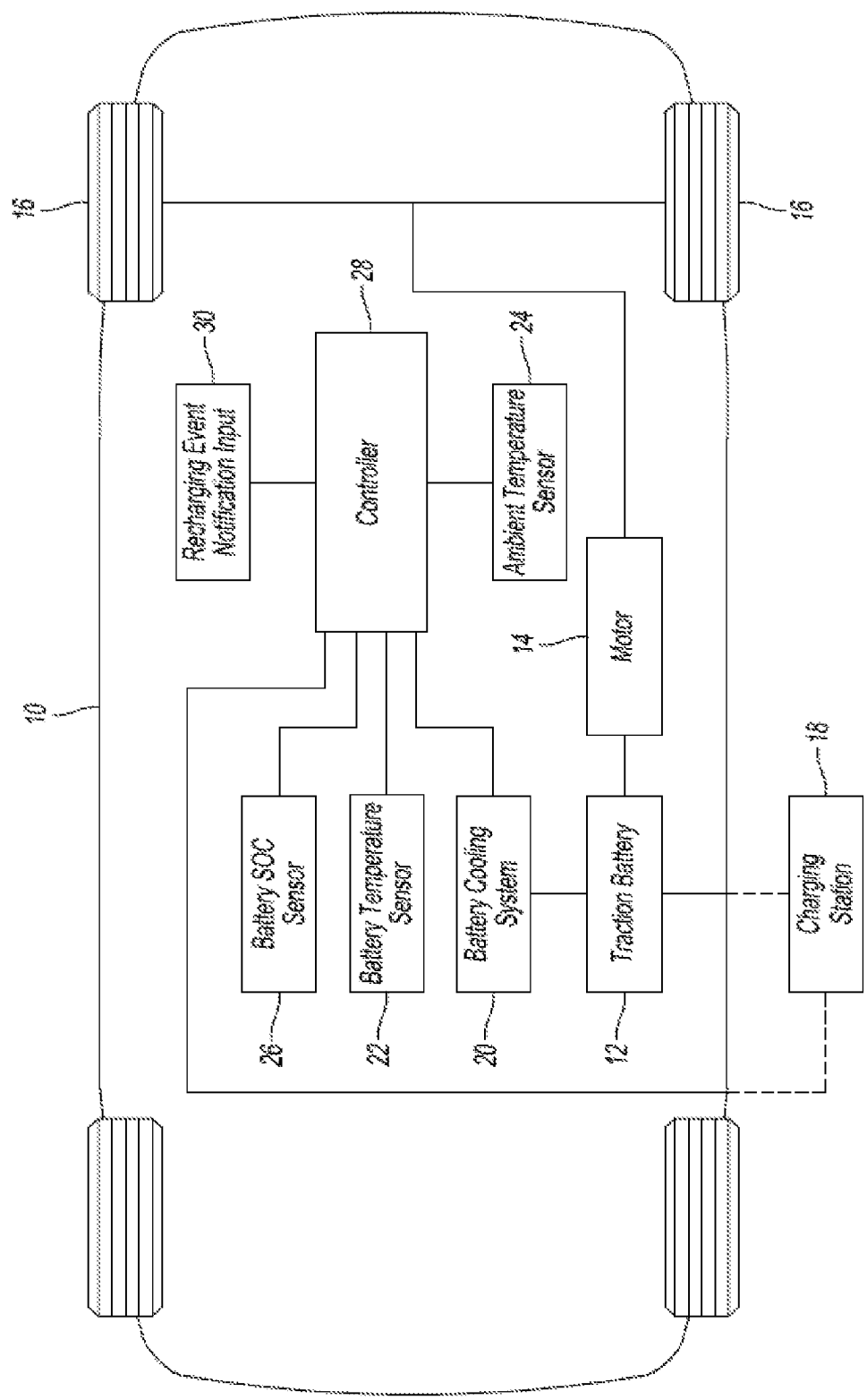

US 10,286,807 B2

LOCATION-BASED ELECTRIC VEHICLE PREEMPTIVE COOLING FOR DC FAST CHARGE

TECHNICAL FIELD

The present disclosure relates to cooling a traction battery of an electric vehicle.

BACKGROUND

Electric vehicles such as battery electric vehicles ("BEV") and plug-in hybrid vehicles ("PHEV") contain a traction battery, such as a high voltage battery, to act as an energy source for the vehicle. A motor converts electrical energy from the traction battery into torque for vehicle propulsion. Upon depletion, the traction battery requires charging. Traction batteries are rechargeable with energy from the electric grid. External charging stations provide power to recharge the traction batteries. Recharging may be done at various rates. For example, DC Fast Charge (DCFC) is a high power charge process which provides a quick charge for vehicles at DCFC stations. Traction batteries may also be charged with normal line current, through inductive charging, or by other methods. During charging, the temperature of the traction batteries rises due to heat generation. Battery thermal management systems are used to regulate traction battery temperature. These systems allow for some temperature increase before high-power cooling is invoked, and are typically used for normal driving and charge events. Charging the traction battery using DCFC results in an undesirably high temperature rise which results in power limiting, an increase in charge time, and a decreased capability to get long distance off the fast charge.

SUMMARY

According to embodiments of the present disclosure, a vehicle is provided. The vehicle includes a traction battery, a battery cooling system configured to cool the traction battery, and a controller configured to request activation of the battery cooling system to cool the traction battery prior to arrival at a DCFC station in response to a signal indicating an expected DCFC event, and configured to inhibit the activation in response to an expected duration of the expected DCFC event being less than a predefined duration. The expected DCFC event may be indicated based on aggregate GPS data, navigation data, or defined by the state of charge of the battery being less than a threshold. The predefined duration of the expected DCFC event based on a temperature of the traction battery, state of charge of the traction battery, ambient temperature, or cabin climate.

According to embodiments of the present disclosure, a method of preemptively cooling a traction battery of a vehicle for DC Fast Charge (DCFC) is provided. The method includes in response to detecting, during a drive cycle and prior to arrival at a DCFC station, an expected DCFC event based on drive history data of the vehicle, requesting initiation by a controller of cooling of the traction battery prior to the arrival. The method also includes inhibiting initiation of cooling of the traction battery in response to an expected duration of the expected DCFC event being less than a predefined duration. The duration of the expected DCFC event is based on a temperature of the traction battery, state of charge of the traction battery, ambient temperature, or cabin climate. The preemptive cooling may be based on drive history data that is aggregate GPS data describing current and previous drive cycles and DCFC events. The aggregate GPS data may show that the vehicle is not following a recognized commute, that the vehicle is near a DCFC station and able to reach it in a predetermined amount of time, or that a range less than a distance to a driver's home, workplace, or previous charging location. The preemptive cooling may also be based on drive history data that is navigation data.

According to embodiments of the present disclosure, a system for preemptively cooling a traction battery for DCFC is provided. The system includes a traction battery, a battery cooling system configured to cool the traction battery, and a controller configured to detect an expected DCFC event prior to arrival at a DCFC station and request activation of the battery cooling system to cool the traction battery prior to the arrival at the DCFC station. The controller is further configured to inhibit the activation in response to an expected duration of the DCFC being less than a predefined duration. The predefined duration is based on a temperature of the traction battery, state of charge of the traction battery, ambient temperature, or cabin climate. The expected DCFC event may be based on aggregate GPS data, navigation data, or defined by the state of charge of the traction battery being below a threshold.

BRIEF DESCRIPTION OF THE DRAWINGS

FIG. 1 is a schematic illustrating an example of an electric vehicle in accordance with an embodiment of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 depicts an example of an electric vehicle 10 in accordance with an embodiment of the present invention. In this embodiment, vehicle 10 is a battery electric vehicle (BEV), lacking an internal combustion engine. In certain other embodiments, however, vehicle 10 may be a hybrid electric vehicle including an internal combustion engine. Vehicle 10 includes a traction battery 12, or battery, and an electric motor 14. For example, battery 12 is a lithium-ion battery pack. Motor 14 converts electrical energy from battery 12 into a motor torque for vehicle propulsion. Battery 12 supplies electrical energy to motor 14 through an inverter (not shown), connected between the battery 12 and the motor 14. Battery 12 discharges to supply electrical energy to motor 14. Motor 14 provides torque to a vehicle drivetrain to drive one or more wheels 16 of vehicle 10.

The traction battery 12 stores energy and is provides a high voltage DC output. Traction battery 12 is rechargeable with electric energy from the electric grid at a charging station 18. Charging station 18 may provide AC or DC to the traction battery 12 of vehicle 10 at a normal charging rate, or at a DC Fast Charge (DCFC) higher voltage rate, by electrically connecting through a charge port (not shown). The vehicle 10 may have equipment configured for a fast charging mode. For example, the vehicle 10 may have fast-charge port (not shown) that is connectable with a fast-charge connector (not shown). The connector may have a cord connected to the charging station 18.

In an embodiment, charging station 18 provides relatively high amperage current to traction battery 12 during the fast-recharging process. For instance, charging station 18 is a "DC Fast Charge" charging station using high voltage (e.g., 400-500V) and high current (e.g., 100-300 A) to charge battery 12. Using DCFC, the battery 12 can be charged relatively quickly. In other embodiments, charging station 18 may provide high amperage current or relatively low amperage current.

Because of the higher current, more heat is produced during the higher-voltage charging modes. In some of the charging modes, such as fast charge, the traction battery 12 must be actively cooled to prevent overheating. The temperature of battery 12 should be maintained within a given range while the battery is operating, such as during discharge and charge. The temperature range depends on the type and properties of the battery 12. In particular, the temperature of battery 12 should not exceed a maximum operating temperature.

The temperature of the battery 12 depends on ambient temperature and the rate of discharge or charge. The following observations can be made with all else being equal. The temperature of battery 12 will be higher with a high ambient temperature (e.g., a hot summer day) than with a low ambient temperature (i.e., a cold winter night). The temperature of battery 12 will be higher when the battery is discharged faster during heavy driving conditions and thereby generates more heat than compared to light driving conditions. The temperature of battery 12 will be higher when the battery is charged by high current, which heats the battery quickly, than when the battery is charged with lower current, which heats the battery slowly.

Vehicle 10 includes a battery cooling system 20 configured to cool the traction battery 12 by cooling or removing heat from battery 12 to lower or maintain the battery temperature below the maximum operating temperature. For instance, battery cooling system 20 delivers chilled coolant to battery 12 and returns warmer coolant back to the battery cooling system. Battery cooling system 20 may either dissipate heat through heat exchangers (e.g., a radiator) to the outside environment or to the interior cabin of vehicle 10.

The battery cooling system 20 is most efficient when vehicle 10 is moving because of increased airflow through the heat exchangers. Thus, the cooling capacity is higher when vehicle 10 is being driven than when it is parked at charging station 18. Battery cooling system 20 is capable of cooling the battery 12 to lower or maintain the battery temperature below the maximum operating temperature while vehicle 10 is being driven.

Vehicle 10 further includes a battery temperature sensor 22, an ambient temperature sensor 24, and a battery state of charge (SOC) sensor 26. Battery temperature sensor 22 may be physically connected to the battery to detect the temperature of the battery. Ambient temperature sensor 24 is configured to detect the temperature of the ambient environment. Battery SOC sensor 26 is a processor, or the like, configured to detect the SOC of the battery. Battery SOC sensor 26 receives appropriate input information from battery 12 for determining the battery SOC.

Vehicle 10 also includes a controller 28 in electrical communication with battery cooling system 20 and sensors 22, 24, and 26. Controller 28 is configured to control battery cooling system 20 to cool battery 12 and lower or maintain the temperature of the traction battery 12 below the maximum operating temperature. Controller 28 controls battery cooling system 20 based on activation requests. The activation requests are based on battery temperature, ambient temperature, maximum operating temperature, battery SOC, and/or inputs.

Preemptively cooling the traction battery 12 to enlarge the temperature difference between the battery temperature and the maximum operating temperature prior to the DCFC event at charging station 18 is desirable. In particular, battery 12 heats up quickly during DCFC because of the high current. Not only will the increased amount of heat be too much for battery cooling system 20 to dispose of while vehicle 10 is parked, but higher temperatures result in longer charging times. Since power consumption of the battery cooling system 20 for preemptively cooling the battery 12 is higher when the vehicle is being driven, the preemptive cooling will only take place upon indication of an expected DCFC event in order to maximize everyday range and maintain fast charging.

In accordance with embodiments of the present invention, controller 28 is further configured to request activation of the battery cooling system 20 in anticipation of a DCFC event, to preemptively cool the traction battery 12, while vehicle 10 is being driven (i.e., during a drive cycle), prior to arrival at charging station 18. Controller 28 requests activation of the battery cooling system 20 to preemptively cool the traction battery 12 while vehicle 10 is being driven to the charging station 18 since the battery cooling system 20 has extra cooling capacity due to increased airflow through the heat exchangers. Battery cooling system 20 preemptively cools the traction battery 12 to reduce the temperature of the traction battery, which should already be below the maximum operating temperature, further below the maximum operating temperature. As with any vehicle feature, the DCFC preemptive cooling feature may be selectable through the on-board vehicle computer system.

Controller 28 detects when a DCFC event is expected request activation of the preemptive cooling operation by the battery cooling system 20. Such collective information with respect to controller 28 is designated as DCFC event information, or "recharging event information."

Vehicle 10 further includes recharging event notification input 30 for communicating the recharging event information to controller 28. Several methods may be used to communicate the recharging event information to controller 28, and recharging event notification input 30 may take various forms as described below. The recharging event information defining an expected DCFC event may be detected by a sensor and/or generated and sent via signal to the controller 28.

The recharging event notification input 30 to predict when a DCFC event is expected may be based on the current and previous drive cycles of the vehicle, or drive history data. The drive history data of the vehicle and/or threshold of the SOC of the traction battery 12 can be used to predict when a DCFC event is expected. The drive history data is based on aggregate global positioning system (GPS) data and/or navigation data. The current and previous drive cycles may show that the vehicle is not following a recognized commute, that the vehicle is geographically near a DCFC charging station and able to reach it in a predetermined amount of time, and/or the vehicle shows a distance to empty, or range, less than the distance to the driver's home, work, or other place the vehicle 10 has had a previous charge. The previous charge may be a non-DCFC event. A DCFC event can also be expected when the SOC of the traction battery 12 falls below a specified threshold. For example, if the SOC is greater than a certain percentage, a DCFC event is not expected, and therefore no preemptive cooling is required. Based on the determination that a DCFC event is expected, recharging event notification input 30 is communicated to controller 28 to request activation of the battery cooling system 20 in order to preemptively cool the traction battery 12 prior to arrival at the DCFC charging station.

Since the battery temperature may rise during the recharging process despite the operation of battery cooling system 20, the recharging process should be completed prior to the battery temperature reaching the maximum operating temperature. As such, the benefits of DCFC can be maintained. Therefore, battery cooling system 20 cools at a rate to complete the recharge prior to reaching the maximum operating temperature. Further, with a large enough temperature difference between the battery temperature and the maximum temperature at the initiation of the recharging process due to preemptive cooling, battery cooling system 20 may not be activated during the recharging process depending on the ambient temperature conditions and/or the duration and rate of the recharging process.

As such, the controller 28 may also be configured to determine whether or not preemptive cooling is needed. Specifically, whether the fast charge process will be completed in duration of time less than a predefined duration. Sensors for ambient temperature, temperature of the traction battery, cabin climate, and/or SOC of the traction battery are inputs for determining whether the DCFC will take longer than a predefined duration of time. If so, the request from controller 28 to activate the battery cooling system 20, for preemptively cooling the traction battery, is not inhibited. If the predefined duration of time is not exceeded, the controller 28 will inhibit the battery cooling system 20 from preemptively cooling, even when a DCFC event is expected. DUC information and other similar conditions can also be used as inputs for determining whether preemptive cooling is needed.

In anticipation of an expected DCFC event at charging station 18, controller 28 is configured to balance (i) the additional electrical energy of battery 12 consumed by battery cooling system 20 for the preemptive cooling operation with (ii) the distance from vehicle 10 to charging station 18 in order to ensure that the vehicle will have the range to reach the charging station. The distance from vehicle 10 to charging station 18 in anticipation of the DCFC event at the charging station is distance until charge (DUC) information. As such, in addition to the temperature of the battery, the ambient temperature, the maximum temperature, and/or the battery SOC, controller 28 is further configured to control battery cooling system 20 based on DUC information.

Methods and systems for preemptively cooling the traction battery of an electric vehicle, while the vehicle is being driven, in anticipation of a DCFC event at a charging station have been described. Preemptive cooling before DCFC may provide the following advantages: extended battery life when performing DCFC frequently; reduced time at DCFC charging station; optimal battery cooling system sizing with smaller components and lower cost. It is also advantageous that the preemptive cooling uses available data to predict DCFC events, which allows the vehicle to operate more efficiently during normal use (i.e., when a DCFC event is not expected) and allows the DCFC event to be completed in a minimal amount of time such that long-distance trips are enabled in a reasonable time.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a traction battery;
    a battery cooling system configured to cool the traction battery; and
    a controller configured to
        request activation of the battery cooling system to cool the traction battery prior to arrival at a DCFC station in response to a signal indicating an expected DCFC event, and
        inhibit the activation in response to an expected duration of the expected DCFC event being less than a predefined duration.

2. The vehicle of claim 1, wherein the expected DCFC event is based on aggregate GPS data.

3. The vehicle of claim 1, wherein the expected DCFC event is based on navigation data.

4. The vehicle of claim 1, wherein the expected DCFC event is defined by the traction battery having a state of charge less than a threshold.

5. The vehicle of claim 1, wherein the expected duration of the expected DCFC event is based on a temperature of the traction battery, state of charge of the traction battery, ambient temperature, or cabin climate.

6. A method of preemptively cooling a traction battery of a vehicle for DC Fast Charge (DCFC), the method comprising:
    in response to detecting, during a drive cycle and prior to arrival at a DCFC station, an expected DCFC event based on drive history data of the vehicle, requesting initiation by a controller of cooling of the traction battery prior to the arrival.

7. The method of claim 6, further comprising inhibiting initiation of cooling of the traction battery in response to an expected duration of the expected DCFC event being less than a predefined duration.

8. The method of claim 7, wherein the expected duration of the expected DCFC event is based on a temperature of the traction battery, state of charge of the traction battery, ambient temperature, or cabin climate.

9. The method of claim 7, wherein the drive history data is navigation data.

10. The method of claim 7, wherein the drive history data is aggregate GPS data describing current and previous drive cycles and DCFC events.

11. The method of claim 10, wherein the aggregate GPS data shows that the vehicle is not following a recognized commute, that the vehicle is near a DCFC station and able to reach it in a predetermined amount of time, or that a range is less than a distance to a driver's home, workplace, or previous charging location.

12. A system for preemptively cooling a traction battery for DC Fast Charge (DCFC), the system comprising:
    a traction battery;
    a battery cooling system configured to cool the traction battery; and
    a controller configured to detect an expected DCFC event prior to arrival at a DCFC station and request activation of the battery cooling system to cool the traction battery prior to the arrival at the DCFC station.

13. The system of claim 12, wherein the controller is further configured to inhibit the activation in response to an expected duration of the DCFC being less than a predefined duration.

14. The system of claim 13, wherein the expected duration of the expected DCFC event is based on a temperature of the traction battery, state of charge of the traction battery, ambient temperature, or cabin climate.

15. The system of claim 13, wherein the expected DCFC event is based on aggregate GPS data.

16. The system of claim 13, wherein the expected DCFC event is based on navigation data.

17. The system of claim 13, wherein the expected DCFC event is defined by the traction battery having a state of charge below a threshold.

* * * * *